United States Patent
Ciano et al.

(10) Patent No.: US 10,565,310 B2
(45) Date of Patent: Feb. 18, 2020

(54) AUTOMATIC MESSAGE PRE-PROCESSING

(71) Applicant: INTERNATIONAL BUSINESS MACHINES CORPORATION, Armonk, NY (US)

(72) Inventors: Giuseppe Ciano, Rome (IT); Francesca Curzi, Rome (IT)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 95 days.

(21) Appl. No.: 15/223,583

(22) Filed: Jul. 29, 2016

(65) Prior Publication Data

US 2018/0032480 A1   Feb. 1, 2018

(51) Int. Cl.
G06F 17/27        (2006.01)
G06F 17/24        (2006.01)
H04L 12/58        (2006.01)

(52) U.S. Cl.
CPC ........ *G06F 17/2785* (2013.01); *G06F 17/248* (2013.01); *G06F 17/2705* (2013.01); *G06F 17/2745* (2013.01); *G06F 17/2775* (2013.01); *H04L 51/02* (2013.01); *H04L 51/16* (2013.01); *H04L 51/18* (2013.01)

(58) Field of Classification Search
CPC ....... H04L 51/02; H04L 51/18; G06F 17/248; G06F 17/2705; G06F 17/2745; G06F 17/2775; G06F 17/2785
See application file for complete search history.

(56) References Cited

U.S. PATENT DOCUMENTS

| | | | |
|---|---|---|---|
| 7,865,560 B2 | 1/2011 | Rohall et al. | |
| 8,566,096 B2 | 10/2013 | Bangalore et al. | |
| 8,688,788 B2 | 4/2014 | Wilson | |
| 9,065,786 B2 | 6/2015 | Plotkin | |
| 9,317,592 B1* | 4/2016 | Bowman | G06F 17/30705 |
| 9,661,138 B2* | 5/2017 | Luers | H04M 3/5232 |
| 9,813,495 B1* | 11/2017 | Van Rensburg | H04L 51/14 |
| 2003/0177190 A1 | 9/2003 | Moody et al. | |
| 2004/0024718 A1* | 2/2004 | Adar | G06N 5/00 706/12 |
| 2012/0158728 A1* | 6/2012 | Kumar | G06F 17/30038 707/737 |
| 2013/0007144 A1* | 1/2013 | Ahern | G06Q 10/107 709/206 |

(Continued)

FOREIGN PATENT DOCUMENTS

WO   2015007228 A1   1/2015

OTHER PUBLICATIONS

Eriks Sneiders, "Review of the Main Approaches to Automated Email Answering", Mar. 2, 2016, Springer International Publishing Switzerland 2016, pp. 9 (Year: 2016).*

(Continued)

*Primary Examiner* — Chau T Nguyen
(74) *Attorney, Agent, or Firm* — Tutunjian & Bitetto, P.C.; Scott Dobson

(57) ABSTRACT

Methods and systems for message pre-processing include extracting a topic from a received message. The topic of the received message is compared to one or more previously sent or received messages to determine if the topic has already been addressed. An attribute of the message is set to indicate whether the topic has already been addressed. A draft response to the message is generated if the topic has not already been addressed.

17 Claims, 5 Drawing Sheets

(56) References Cited

U.S. PATENT DOCUMENTS

| | | | |
|---|---|---|---|
| 2013/0232204 A1 | 9/2013 | Barney et al. | |
| 2013/0339276 A1* | 12/2013 | Lai | G06Q 10/107 706/12 |
| 2014/0201296 A1* | 7/2014 | Patfield | H04L 51/04 709/206 |
| 2015/0032724 A1* | 1/2015 | Thirugnanasundaram | G06F 17/30654 707/722 |
| 2015/0113435 A1 | 4/2015 | Phillips | |
| 2015/0134749 A1* | 5/2015 | Bhamidipaty | G06Q 10/107 709/206 |
| 2015/0142897 A1* | 5/2015 | Alten | H04L 51/36 709/206 |
| 2015/0347900 A1* | 12/2015 | Bell | G06F 16/3329 706/11 |
| 2016/0259778 A1* | 9/2016 | Cookson | G06F 17/2785 |
| 2016/0366088 A1* | 12/2016 | Abou Mahmoud | H04L 51/30 |
| 2017/0011116 A1* | 1/2017 | Liu | G06F 16/3329 |
| 2017/0032439 A1* | 2/2017 | Paton | G06Q 30/0623 |
| 2017/0155607 A1* | 6/2017 | Chakra | H04L 51/16 |
| 2017/0161364 A1* | 6/2017 | Clark | H04L 67/306 |

OTHER PUBLICATIONS

Kumar et al., "A Framework for Email Clustering and Automatic Answering Method", Nov. 2012, International Journal of Advanced Research in Computer Engineering & Technology, vol. 1, Issue 9, pp. 8 (Year: 2012).*

Aloui, A. et al., "Automatic Classification and Response of E-mails" International Journal of Digital Society (IJDS) (Mar. 2010) pp. 3-9, vol. 1, No. 1.

* cited by examiner

AUTOMATIC MESSAGE PRE-PROCESSING

BACKGROUND

Technical Field

The present invention generally relates to message processing and, more particularly, to pre-processing messages from a variety of sources in accordance with information across messaging protocols.

Description of the Related Art

In distributed systems, many different kinds of devices (e.g., laptops, smart phones, tablets, etc.) can be sources of email, text messages, instant messages, and other forms of interpersonal communication. In such a context, a message may be sent through multiple channels to increase the likelihood of a prompt response. However, when a message is sent to a user whose device is turned off or otherwise inaccessible, there may be a delay in receiving the multiple messages, such that an issue may be resolved through another channel by the time the messages are delivered.

In addition, current systems order email based on the actual time of sending, and it can occur that mail that is delayed will be left in a backlog due to the arrival of other messages in the meantime. In this case, the user may not realize that a message has arrived.

SUMMARY

A method for message pre-processing includes extracting a topic from a received message. The topic of the received message is compared to one or more previously sent or received messages to determine if the topic has already been addressed. An attribute of the message is set to indicate whether the topic has already been addressed. A draft response to the message is generated if the topic has not already been addressed.

A system for message pre-processing includes a document analyzing module comprising a processor configured to extract a topic from a received message and to compare the topic of the received message to one or more previously sent or received messages to determine if the topic has already been addressed. A message pre-processor is configured to set an attribute of the message to indicate whether the topic has already been addressed and to generate a draft response to the message if the topic has not already been addressed.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Embodiments of the present invention perform pre-processing on incoming messages. The pre-processing takes into account messages and conversations over multiple different channels and automatically assigns attributes to the incoming messages that reflect the status of the message and whether its content may have been addressed in another medium.

It is to be understood in advance that, although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Figure 1:
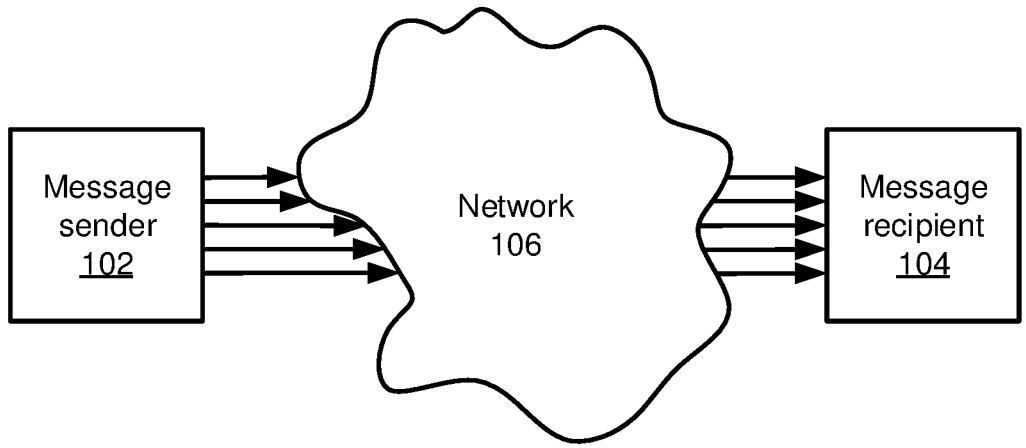
FIG. 1 is a diagram of a communication system in accordance with the present principles.

Referring now to FIG. 1, a communications system 100 is shown. A message sender 102 communicates with a message recipient 106 over a network 104, which may be a single network or may be a combination of different networks. It should be understood that multiple messages may be sent, over a variety of different communications channels, at the same time or at different times. In particular, the message may include communications via one or more of email, text message, instant message, microblogs, social media posts, or voicemail messages, and may in fact be communicated over one or more different networks 104, including for example the internet, the telephone network, a local area network, a wide area network, the Internet an ad hoc network, and other forms of wired or wireless communications. In addition, the content of the messages in each communications channel may differ somewhat from one to the next, while still addressing the same topics. For example, a sender may use different phrasing or may include multiple topics, some of which may not be included in every message.

During normal operation, one or more communications channels between the sender 102 and the recipient 104 may be disrupted. This may occur for any reason, including a loss of power or connectivity at either the sender side or the receiver side, a disruption of one or more communications links within the network 104, network congestion, overloaded servers, a denial of service attach, a natural disaster, etc. In such a scenario, one or more of the messages may be delayed, causing one version of the message to arrive substantially later than one or more other messages. This delay can last anywhere from moments to days and can happen without any notification to the sender or to the recipient.

In one exemplary scenario, the recipient 104 may have already responded to one version of the message by the time the delayed message arrives. The response to the message is stored for later analysis. In this case, the present embodiments analyze the delayed message and determine that the content of the message has already been addressed in one or more other, earlier messages. The present embodiments then assign properties to the message based on whether or not the topic(s) of the message have been addressed (e.g., by lowering the message's priority or by assigning a label to the message). Examples of message properties may further include a mail "color" or category, whether the message is confidential, a description of the message, and a return receipt. In examples where the delayed message is substantially identical to another message that the recipient has already responded to, the receipt of the delayed message may be suppressed entirely.

These properties may be set or altered according to one or more policies that map the values of the different properties to specific conditions. For example, if a particular topic or key word is detected in a message, the message may be automatically categorized according to a policy. The present embodiments may furthermore provide an automatic draft response to the message, which may be sent automatically or which the user may review and send at their discretion. The draft response may be tailored to a particular topic or sender and may be one of a set of draft templates that is selected in accordance with information extracted from the received message.

Figure 2:
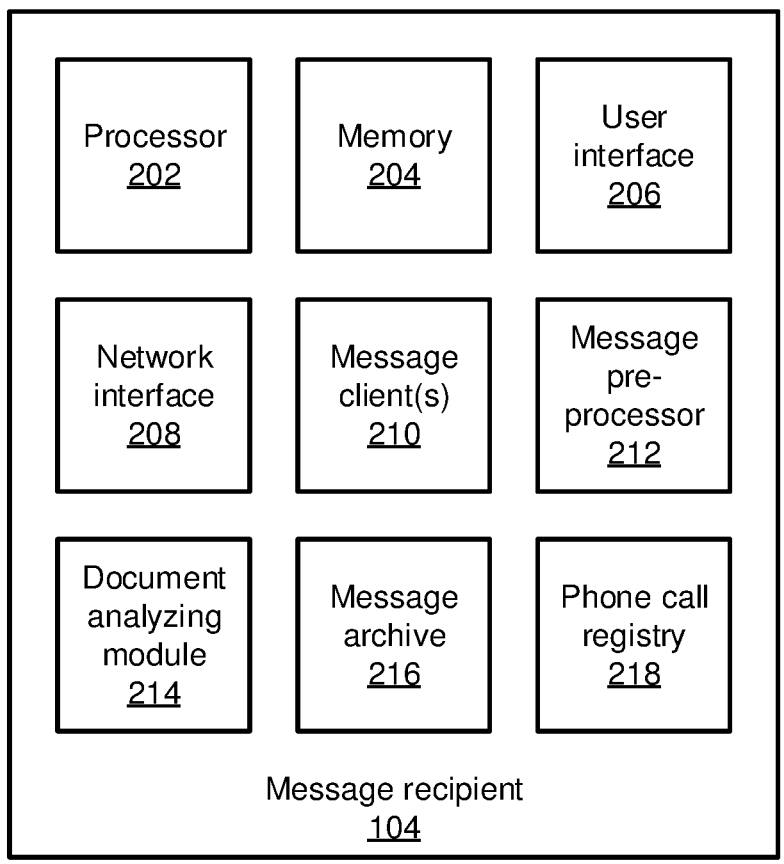
FIG. 2 is a diagram of a message recipient system in accordance with the present principles.

Referring now to FIG. 2, additional detail on the message recipient 104 is shown. A message recipient device 104 includes a hardware processor 202 and a memory 204. A user interface 206 allows a user to read and send messages over the network 106 via network interface 208. In addition, the message recipient device 104 includes one or more functional elements that, in one embodiment, may be implemented as software that is stored in memory 204 and executed by hardware processor 202. In an alternative embodiment, the functional modules may be implemented as one or more discrete hardware components, for example in the form of application specific integrated chips or field programmable gate arrays.

The message recipient device 104 has one or more message clients 210 installed, each of which is capable of receiving messages from a sending user 102 across one or more different communication channels. For example, the message clients 210 may include an instant messaging client, an email client, a web browser, a voicemail client, etc. When a message arrives at the message recipient device 104, a message pre-processor triggers the analysis of the message using a document analyzing module 214 to extract keywords and other relevant pieces of information that describe the message. This analysis can include any form of document analysis including, e.g., semantic analysis, linguistic analysis, and/or voice recognition.

Once the content of the message has been identified, the message pre-processor 212 considers, for example, message archive 216 and phone call registry 218 to determine whether the message recipient 104 has already responded to the message. For example, if a version of the message has arrived previously through another channel, and the recipient user responded, then there is no need to respond again. Similarly, if the recipient device 104 has called the message sender 102 over the phone, then it is likely that they have already addressed the content of the message. Voicemail messages may also be considered, with speech recognition analysis providing the ability to determine the content of voice recordings.

It is further possible that the recipient user will have responded to the message in another message chain. As such, the message pre-processor 212 may search based on the topic and content of the message for other messages that match the same, without being a direct reply to the received message. The message archive 216 may include information beyond just the content of the messages that can be used to associate multiple different messages in a single discussion. Such additional information may include threading information that associates the messages of a discussion with one another, message metadata providing contextual information for a message, etc.

It should be understood that, although document analysis and message-preprocessing are described herein as being performed at the recipient (e.g., at a client device) these features may be performed anywhere. In alternative embodiments, document analysis and message pre-processing may be performed at the server side or, for example, in a distributed cloud computing system, without affecting the principles of operation. In such an embodiment, the clients 210 and the message archive 216 may also be implemented at a remote location, with document analyzing module 214 and the message pre-processor 212 assessing messages at a remote server and subsequently forwarding any pertinent information (e.g., the draft responses) to the message recipient 104 for display.

Based on this determination, the message pre-processor 212 makes updates to the attributes of the message. These attributes may include, for example, a message priority, one or more flags (e.g., flagging the message as "read" if a similar message arrived by another communications channel), or a message category. The message pre-processor 212 can also create a draft response to the message that includes information drawn from the message archive 216 to, for example, provide answers to questions in the received message. This draft reply can be presented to a user for review via the user interface 206 or may be sent automatically.

Figure 3:
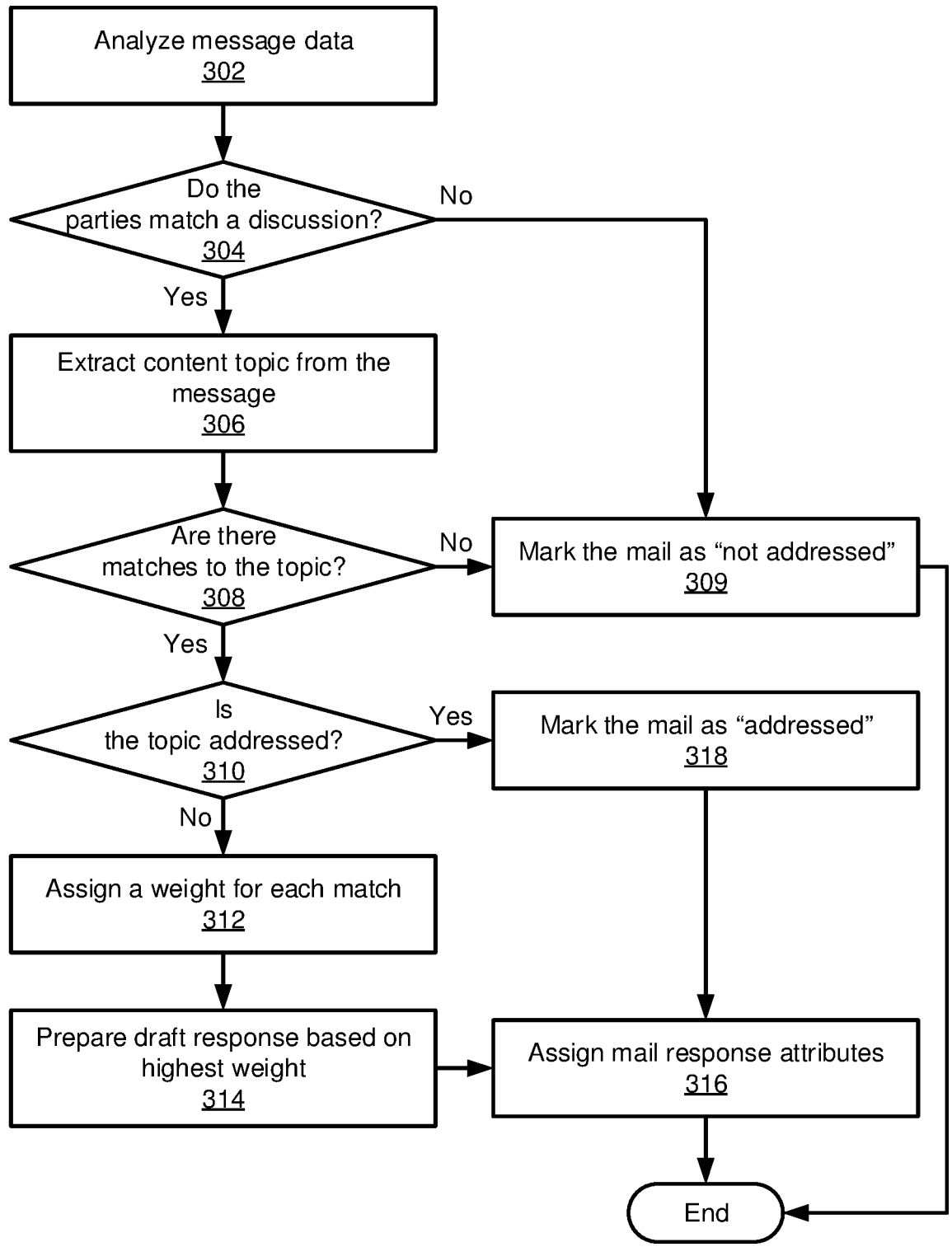
FIG. 3 is a block/flow diagram of a method for pre-processing messages in accordance with the present principles.

Referring now to FIG. 3, a method for pre-processing messages is shown. Block 302 analyzes the data of a received message to extract parties (e.g., identities of the sender and recipient), keywords, and other information about the message's content. Block 304 determines whether the parties involved match any existing discussion in the message archive 216 that took place since the message was sent. If not, block 309 marks the message as being "not addressed" and processing ends—the lack of any other discussion between the sender and recipient is strong evidence that the recipient has not yet addressed the topic(s) of the message. If there is another message between the parties since the message was sent, block 306 determines the topic of the message. Block 308 checks the message archive 216 to determine whether there is a match to the topic being discussed in the message. If not, block 309 marks the message as being "not addressed" and processing stops.

It should be recognized that the present embodiments can extract the topics and other information from incoming messages using semantic analysis engines that are capable of determining the contents of text. If multiple topics are extracted from a message, each topic may be considered separately to determine whether that topic has been addressed.

Block 310 determines whether any of the matching discussions in the message archive 216 adequately addresses the topic of the message. For example, if the message includes a question, block 310 determines whether the question has been answered previously. Block 310 may employ semantic analysis to assess each of the messages in the related discussions to determine whether anything has been said which can be considered to address the topic. The semantic analysis is used to generate weights for different potential responses to the topic, and the message having the highest weight above a threshold may be selected. If a message is found that is sufficiently responsive to the topic (e.g., having a weight above a threshold weight), block 318 marks the message as being "addressed" and block 316 assigns any appropriate message response attributes. Processing then ends.

If the topic has not been addressed yet, block 312 assigns a weight for each matching discussion. Block 314 drafts a response message appropriate to the message based on the discussion having the highest weight and presents that draft response to the user via user interface 206. The weight can be calculated based on the relevance of the topic being discussed, the time of the most recent update to the discussion, and the priority of the information source (for example, if phone calls have a higher weight than chatting or email). Thus the answer weight may be calculated as a normalized combination of any of a variety of different criteria, such as topic, sender, receiver, relevance of the response, time provided, and source of information. Block 314 may, for example, select one draft from a set of draft templates to use as a base and then fill in details for the response based on, e.g., other archived messages in the discussion, the sender of the message, and the topic. Block 316 then assigns any appropriate message response attributes and processing ends.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 4:
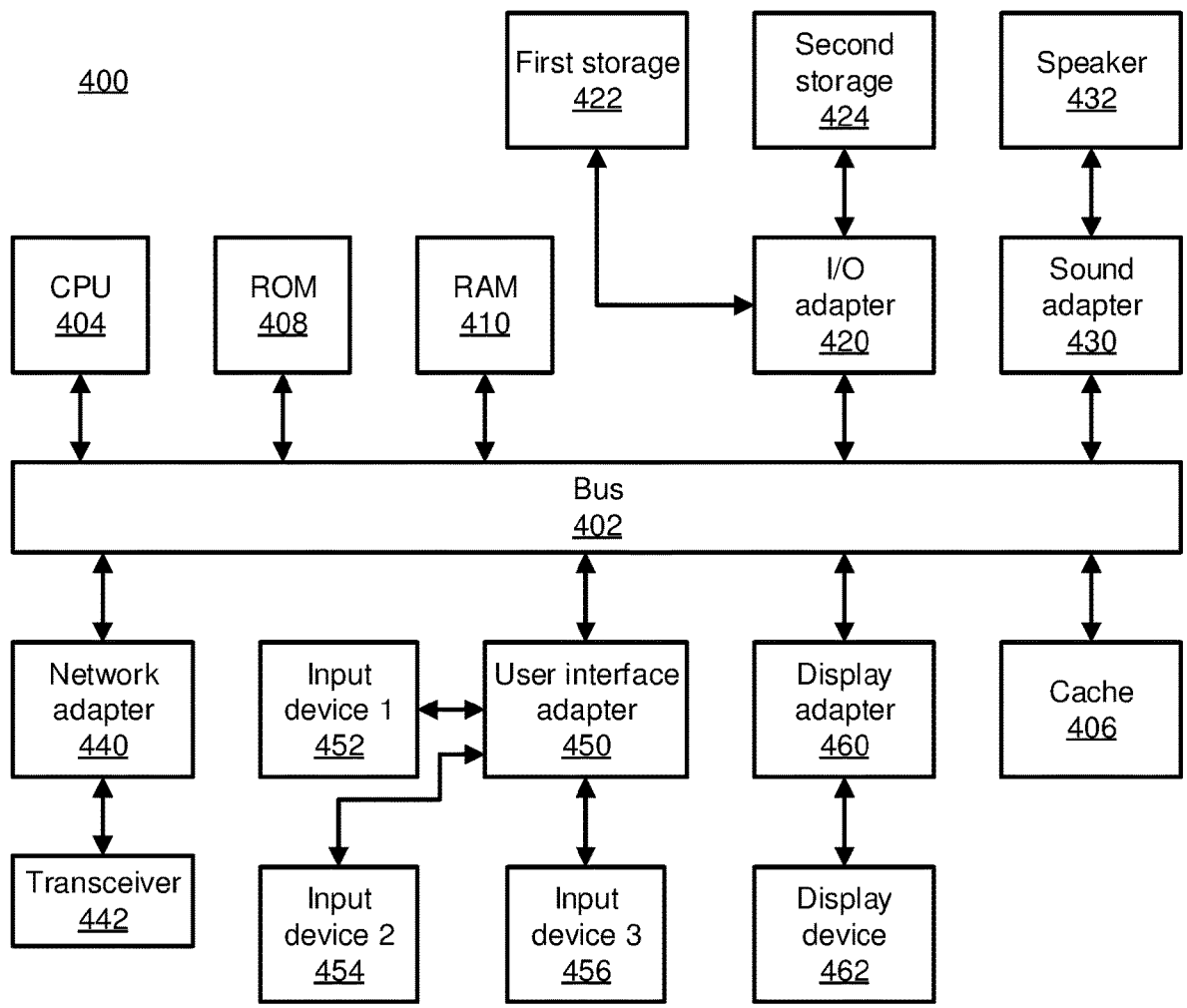
FIG. 4 is a block diagram of a processing system in accordance with the present principles.

Referring now to FIG. 4, an exemplary processing system 400 is shown which may represent the message recipient 104. The processing system 400 includes at least one processor (CPU) 404 operatively coupled to other components via a system bus 402. A cache 406, a Read Only Memory (ROM) 408, a Random Access Memory (RAM) 410, an input/output (I/O) adapter 420, a sound adapter 430, a network adapter 440, a user interface adapter 450, and a display adapter 460, are operatively coupled to the system bus 402.

A first storage device 422 and a second storage device 424 are operatively coupled to system bus 402 by the I/O adapter 420. The storage devices 422 and 424 can be any of a disk storage device (e.g., a magnetic or optical disk storage device), a solid state magnetic device, and so forth. The storage devices 422 and 424 can be the same type of storage device or different types of storage devices.

A speaker 432 is operatively coupled to system bus 402 by the sound adapter 430. A transceiver 442 is operatively coupled to system bus 402 by network adapter 440. A display device 462 is operatively coupled to system bus 402 by display adapter 460.

A first user input device 452, a second user input device 454, and a third user input device 456 are operatively coupled to system bus 402 by user interface adapter 450. The user input devices 452, 454, and 456 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 452, 454, and 456 can be the same type of user input device or different types of user input devices. The user input devices 452, 454, and 456 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present principles provided herein.

Figure 5:
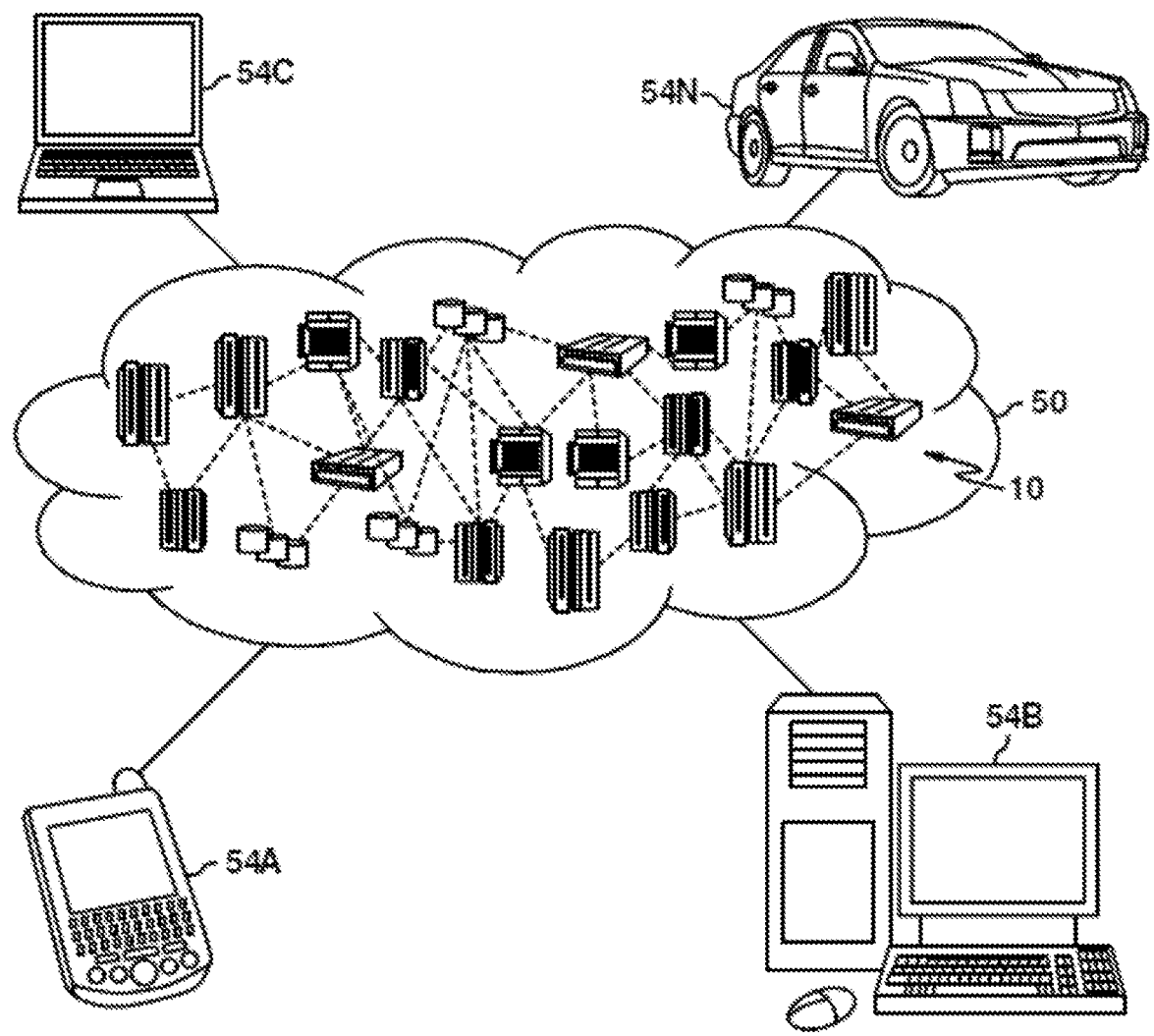
FIG. 5 is a diagram of a cloud computing environment according to the present principles.

Referring now to FIG. 5, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 10 and cloud computing environment 50 can communicate with any type of computerized device over any type of network and/or network addressable connection (e.g., using a web browser).

Figure 6:
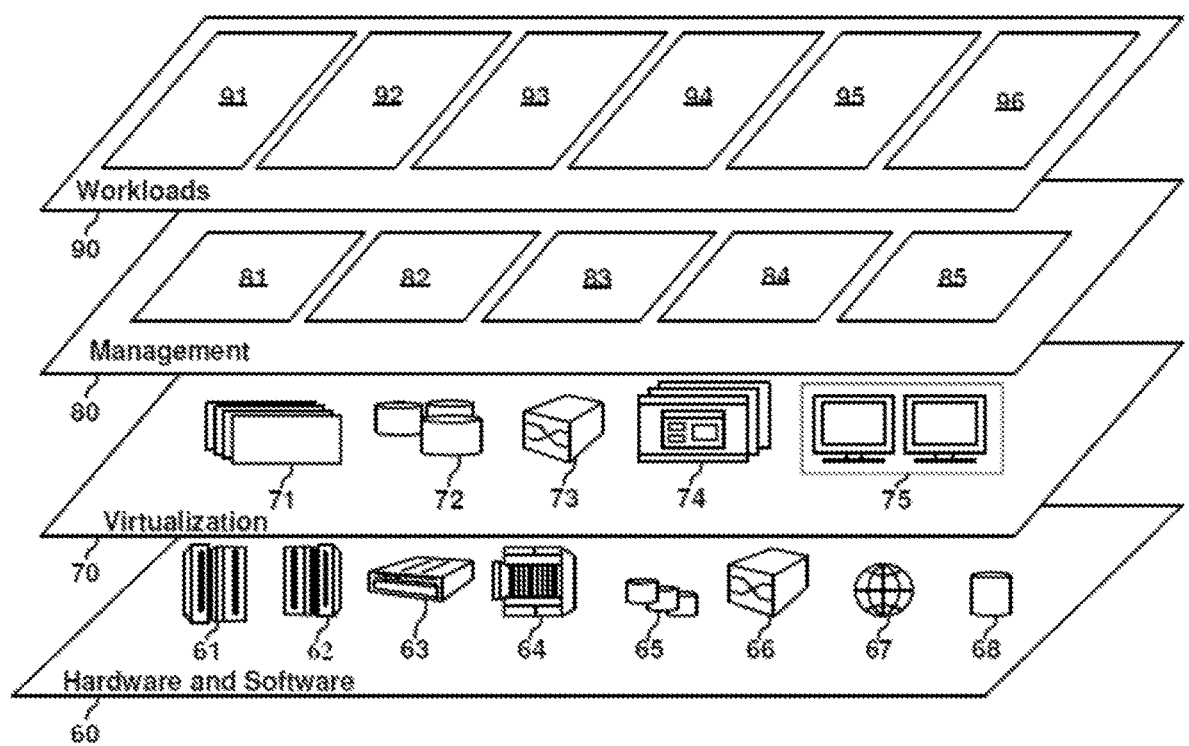
FIG. 6 is a diagram of abstraction model layers according to the present principles.

Referring now to FIG. 6, a set of functional abstraction layers provided by cloud computing environment 50 (FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and received message pre-processing 96.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for message pre-processing, comprising:
   comparing a topic of a received message to one or more previously sent or received messages to determine if the topic has already been addressed using a processor that assigns answer weights, each of the answer weights representing a likelihood a respective one of the one or more previously sent or received messages addresses the topic, the likelihood determined by comparing each of the answer weights to a threshold such that at least a given one of the one or more previously sent or received messages having a highest answer weight above the threshold is considered to have addressed the topic;
   setting an attribute of the received message to indicate whether the topic has already been addressed;
   automatically generating a draft response to the received message that addresses the topic if the topic has not already been addressed, based on a prior discussion having the highest one of the answer weights from among a set of prior discussions in the one or more previously sent or received messages; and
   automatically sending the draft response to a sender of the received message.

2. The computer-implemented method of claim 1, further comprising determining whether there is an existing discussion in the one or more previously sent or received messages between a sender of the received message and a recipient of the received message.

3. The computer-implemented method of claim 2, further comprising setting the attribute of the received message to indicate that the topic has not already been addressed if there is no existing discussion between the sender and the recipient.

4. The computer-implemented method of claim 2, wherein comparing the topic of the received message to the one or more previously sent or received messages comprises weighting each of message in each existing discussion to generate an answer weight that represents how likely the message is to have addressed the topic.

5. The computer-implemented method of claim 4, wherein the answer weight is calculated as a normalized function that includes criteria based on topic, sender, receiver, relevance of the response, time provided, and source of information.

6. The computer-implemented method of claim 1, further comprising displaying the draft response to a user for review.

7. The computer-implemented method of claim 1, wherein generating the draft response comprises selecting one of a plurality of template responses based on a sender of the received message and the topic.

8. The computer-implemented method of claim 1, wherein extracting the topic from the received message comprises performing a semantic analysis that determines one or more topics from textual content of the received message.

9. A computer program product for message pre-processing, the computer program product comprising a computer readable storage medium having program instructions embodied therewith, the program instructions readable by a computer to cause the computer to:
   extract a topic from a received message;
   compare the topic of the received message to one or more previously sent or received messages to determine if the topic has already been addressed using a processor that assigns answer weights, each of the answer weights representing a likelihood a respective one of the one or more previously sent or received messages addresses the topic, the likelihood determined by comparing each of the answer weights to a threshold such that at least a given one of the one or more previously sent or received messages having a highest answer weight above the threshold is considered to have addressed the topic;
   set an attribute of the received message to indicate whether the topic has already been addressed;
   automatically generate a draft response to the received message that addresses the topic if the topic has not already been addressed, based on a prior discussion having the highest one of the answer weights from among a set of prior discussions in the one or more previously sent or received messages; and
   automatically sending the draft response to a sender of the received message.

10. A system for message pre-processing, comprising:
   a document analyzing module comprising a processor configured to extract a topic from a received message and to compare the topic of the received message to one or more previously sent or received messages to determine if the topic has already been addressed by assigning answer weights, each of the answer weights representing a likelihood a respective one of the one or more previously sent or received messages addresses the topic, the likelihood determined by comparing each of the answer weights to a threshold such that at least a given one of the one or more previously sent or received messages having a highest answer weight above the threshold is considered to have addressed the topic;

a message pre-processor configured to set an attribute of the received message to indicate whether the topic has already been addressed and to automatically generate a draft response to the received message that addresses the topic if the topic has not already been addressed, based on a prior discussion having the highest one of the answer weights from among a set of prior discussions in the one or more previously sent or received messages; and a transceiver for automatically sending the draft response to a sender of the received message.

11. The system of claim 10, wherein the document analyzing module is further configured to determine whether there is an existing discussion in the one or more previously sent or received messages between a sender of the received message and a recipient of the received message.

12. The system of claim 11, wherein message pre-processor is further configured to set the attribute of the received message to indicate that the topic has not already been addressed if there is no existing discussion between the sender and the recipient.

13. The system of claim 11, wherein the document analysis module is further configured to weight each of message in each existing discussion to generate an answer weight that represents how likely the message is to have addressed the topic.

14. The system of claim 13, wherein the answer weight is calculated as a normalized function that includes criteria based on topic, sender, receiver, relevance of the response, time provided, and source of information.

15. The system of claim 10, further comprising a user interface configured to display the draft response to a user for review.

16. The system of claim 10, wherein the message pre-processor is further configured to select one of a plurality of template responses based on a sender of the received message and the topic.

17. The system of claim 10, wherein the document analyzing module is further configured to perform a semantic analysis that determines one or more topics from textual content of the received message.

* * * * *